(12) United States Patent
Grossmann et al.

(10) Patent No.: US 9,557,247 B2
(45) Date of Patent: Jan. 31, 2017

(54) SENSOR MODULE FOR DETECTING AN OPERATING PARAMETER, METHOD FOR MONITORING A SENSOR MODULE

(75) Inventors: Alex Grossmann, Leonberg (DE); Dirk Daecke, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 184 days.

(21) Appl. No.: 14/238,463

(22) PCT Filed: Jun. 12, 2012

(86) PCT No.: PCT/EP2012/061075
§ 371 (c)(1),
(2), (4) Date: Jun. 17, 2014

(87) PCT Pub. No.: WO2013/023804
PCT Pub. Date: Feb. 21, 2013

(65) Prior Publication Data
US 2014/0290394 A1      Oct. 2, 2014

(30) Foreign Application Priority Data

Aug. 17, 2011    (DE) .................. 10 2011 081 147

(51) Int. Cl.
G08B 21/00        (2006.01)
G01M 17/007       (2006.01)
G01D 3/08         (2006.01)

(52) U.S. Cl.
CPC .............. *G01M 17/007* (2013.01); *G01D 3/08* (2013.01)

(58) Field of Classification Search
CPC ........................................ G01D 1/00

USPC ....................... 340/425.1, 438, 999
See application file for complete search history.

(56) References Cited

U.S. PATENT DOCUMENTS

2010/0287398 A1    11/2010  Froschhammer et al.

FOREIGN PATENT DOCUMENTS

| CN | 1646880 A | 7/2005 |
|----|-----------|--------|
| CN | 1957196 A | 5/2007 |
| DE | 41 05 283 | 9/1992 |
| DE | 43 03 583 | 8/1994 |
| DE | 44 13 281 | 10/1995 |
| DE | 199 05 071 | 8/2000 |
| DE | 199 11 526 | 9/2000 |
| DE | 20 31 94 23 | 4/2004 |
| JP | 54-38156 | 3/1979 |

(Continued)

OTHER PUBLICATIONS

International Search Report for PCT/EP2012/061075, dated Oct. 17, 2012.

*Primary Examiner* — Jeffery Hofsass
(74) *Attorney, Agent, or Firm* — Norton Rose Fulbright US LLP; Gerard Messina

(57) ABSTRACT

A sensor module includes a sensor element set up to output a sensor signal, an A/D converter connected to the sensor element, a signal transmission unit connected to the A/D converter and set up for the transmission of a sensor signal converted by the A/D converter, and a supply signal tap at which an unconverted supply signal that represents a supply voltage or a supply current of the sensor module is present. An input of the A/D converter is connected to the supply signal tap. The unconverted supply signal that represents a supply voltage or a supply current of the sensor module is converted into a converted supply signal by the A/D converter that converts the sensor signal.

9 Claims, 2 Drawing Sheets

(56) References Cited

FOREIGN PATENT DOCUMENTS

| | | |
|---|---|---|
| JP | 5-101294 | 4/1993 |
| JP | 9-130312 | 5/1997 |
| JP | 2000-285361 | 10/2000 |
| JP | 2005-78341 | 3/2005 |
| JP | 2006-309693 | 11/2006 |
| JP | 2010-541056 | 12/2010 |

SENSOR MODULE FOR DETECTING AN OPERATING PARAMETER, METHOD FOR MONITORING A SENSOR MODULE

BACKGROUND OF THE INVENTION

1. Field of the Invention

The present invention relates to a sensor module for detecting an operating parameter of a motor vehicle.

2. Description of the Related Art

It is known to use sensor modules of many different types, in particular in motor vehicles, to acquire various operating parameters, such as pressure sensors, position sensors, air mass sensors, distance sensors, brightness sensors, and the like. The sensor modules convert the physical quantity that is to be acquired, i.e. the relevant operating parameter, into an electrical signal that is supplied to a central or remote data processing device for further processing.

In particular, active sensor modules are used that require a power supply, for example in order to acquire the operating parameter or in order to prepare a sensor signal directly at the sensor module in order to enable disturbance-free transmission. In motor vehicles, the supply voltage required for this is transmitted via a supply line that can have a high resistance, for example due to corroded or incompletely joined plug contacts. If, however, an active sensor module is supplied with a voltage that is too low, the signals emitted by the sensor module are faulty or unreliable.

Sensor models are known that recognize undervoltage and overvoltage states of the voltage supply. If the supply voltage falls below or exceeds a fixed, specified voltage threshold, this state is recognized by the sensor module. The sensor module then interrupts the transmission of the sensor signals to the data processing device. Alternatively, the sensor module can send an error signal (instead of the measurement signal). The decision as to whether an undervoltage or overvoltage is present takes place in the sensor module, due to the specified thresholds, and requires a significant circuit outlay. An example of such a sensor module is given in the following.

Published German patent application document DE 41 05 283 A1 describes a flow measurement device having a pressure sensor connected to a computing unit. In addition, an undervoltage recognition circuit is connected to this computing unit. If a voltage collapse is detected, the computing unit locally stores all important data. Accordingly, the supply voltage is immediately evaluated locally and protective measures are taken directly at the location in the sensor module. This requires complex circuit parts in the sensor module for the evaluation of the supply voltage and for the taking of the protective measures. In addition, in the sensor module elements must be provided that enable a secure storing. This requires a high-capacitance energy storage device that ensures the supply of energy during the data storing.

The complex circuit elements for the voltage evaluation and for the data storage, and of the energy storage device, require complex circuit elements and produce a significant space requirement. Because in particular in automotive technology little space is available for sensors, and the additional circuit elements cause a substantial circuit outlay, an object of the present invention is to reduce the space requirement in comparison with the existing art and to reliably recognize a drop in voltage in a sensor module.

BRIEF SUMMARY OF THE INVENTION

The present invention enables an extremely reliable, precise, and easy-to-implement monitoring of the supply voltage of a sensor module. In particular, no significant hardware modifications in a motor vehicle are necessary for the realization of the present invention, and here it is particularly advantageous that the cabling does not have to be modified. In addition, central processing components can continue to be used that are connected to the individual sensors via lines, in order to additionally provide the function of a supply voltage monitoring. The sensor modules according to the present invention do not require any particular circuit outlay, and in particular do not require an energy storage device that would be required for the operation of voltage monitoring devices in the sensor module. In the realization of the present invention, existing hardware designs that are standard in the automotive field can essentially be retained. In particular, numerous components of already-existing motor vehicle devices can substantially continue to be used without having to make significant modifications to the hardware.

According to the present invention, in the signal preparation, in particular in the case of an analog/digital conversion, and in the case of a signal transmission, in addition to a sensor signal that represents an operating parameter that is to be acquired, a supply signal is also processed parallel to the sensor signal, the supply signal representing a supply voltage or a supply current. Therefore, the sensor signal is processed to the same extent as the supply signal, in particular in that, in a sensor module, both signals are locally converted from analog to digital form, and are transmitted together by a signal transmitting unit. The signal transmitting unit transmits a combination signal that represents both the supply signal and the sensor signal via a connecting line that transmits the combination signal to a central or remote data processing device. If an undervoltage occurs in the supply signal, a relevant signal representing the supply signal is transmitted via a line in the context of the transmitted combination signal. The data processing unit that receives the combination signal can therefore evaluate not only the content of the sensor signal but also the reliability of the sensor signal, by taking into account the supply signal. If the supply signal represents a supply state that is within a nominal range, the sensor signal can be assumed to be a correct sensor signal. If the supply signal represents a supply state that is outside a standard range, then the associated sensor signal can be designated unreliable. At the same time, in the latter case a warning signal can be given that represents a supply state outside the standard. In particular the level of the supply voltage and/or the level of the supply current are designated as supply states.

The present invention relates to a sensor module set up to acquire an operating parameter of a motor vehicle. The sensor module includes a sensor element set up for the outputting of a sensor signal. The sensor element converts a physical quantity that represents the operating parameter into the sensor signal, present as an electrical signal.

As sensor elements, in particular pressure sensors are used that are based on expansion measurement strips or that include pressure sensor elements whose resistance or whose falling electrical voltage is a function of the mechanical tension or pressure acting thereon. In addition, the sensor element can include electromechanical or magnetic position sensors, for example position sensors based on the Hall effect, or also optically scanning position sensors. In addition, the sensor module can be an air mass sensor that for example uses ultrasound to acquire an air mass flow. The sensor element can be a passive sensor element or can be an active sensor element to which a voltage is applied during operation, for example in order to acquire a resistance. The sensor module is in particular a sensor module set up to acquire an operating parameter of an internal combustion engine control unit of the motor vehicle, or can be a sensor module that acquires quantities such as temperature, distance from an obstacle, moisture, precipitation, or more complex quantities such as a video image. The sensor element is in particular set up to output an analog sensor signal that represents the acquired operating parameter and for example one of these operating parameters.

The sensor module according to the present invention in addition includes an analog/digital converter, referred to as an A/D converter hereinafter, that is connected to the sensor element. In particular, the output of the sensor element is connected to the A/D converter. The sensor element can be connected directly to the A/D converter, or can be connected via further data transmission components such as a multiplexer. Thus, the connection between the sensor element and the A/D converter can be a direct connection or an indirect connection.

The sensor module further includes a signal transmission unit connected to the A/D converter. Here as well, the connection can be direct or indirect; in particular, an output of the A/D converter can be connected directly to the signal transmission unit, in particular to the input thereof. Alternatively, this output is connected to the signal transmission unit via a further data transmission component, for example via a multiplexer. The signal transmission unit is set up to transmit the signal converted by the A/D converter.

The sensor module further includes a supply signal tap at which an unconverted supply signal is present that represents a supply voltage or a supply current of the sensor module. The unconverted supply signal can immediately represent the level of the supply voltage or of the supply current or a quantity linked directly therewith, for example a sampling ratio or a frequency or a pulse width of a control signal used within the power supply of the sensor module. Thus, the supply signal can represent the supply current or the supply voltage via the amplitude or via other signal quantities such as frequency, sampling ratio, or pulse width.

According to the present invention, an input of the A/D converter is connected to the supply signal tap. Here as well, the input of the A/D converter can be connected directly to the supply signal tap or can be connected thereto via further signal transmission components, such as a multiplexer. This connection can therefore be direct or indirect. Like the connection between the sensor element and the A/D converter, or the connection between the A/D converter and the signal transmission unit, the connection between the input of the A/D converter and the supply signal tap can be connected via signal preparation components such as an amplifier, an impedance converter, or a voltage divider. The A/D converter, whose input is in this way connected directly or indirectly to the supply signal tap, is the same A/D converter to which the sensor element is also connected. Here, the input of the A/D converter connected to the supply signal tap can also be (indirectly) connected to the sensor element, for example via a multiplexer, or one and the same A/D converter has a plurality of inputs, one input being connected to the supply signal tap and a further input being connected to the sensor element, for example via a direct or indirect connection, for example via a multiplexer within the input stage of the A/D converter. In addition, the A/D converter can be fashioned as a multichannel A/D converter, one channel being connected to the supply signal tap and a further channel being connected to the sensor element.

The signal transmission unit can be set up to transmit a supply signal converted by the A/D converter. The converted supply signal represents the supply voltage or the supply current of the sensor module. In particular, the converted supply signal represents the supply state of the sensor module. The converted supply signal is present in particular in digital form. The converted supply signal represents, in digital form, the unconverted supply signal, which is present in particular in analog form, or is outputted by the sensor element. The converted supply signal and the unconverted supply signal differ essentially only in their form, the unconverted supply signal being present in analog form and the converted sensor signal being present in digital form. Therefore, the term supply signal, without more precise specification, designates the unconverted and the converted supply signal. The signal transmission unit has an output at which, via the same electrical contact point, both the supply signal and the sensor signal are outputted, the supply signal and the sensor signal being combined to form a single transmission signal. The transmission signal is therefore also referred to as a combination signal. The contact point is in particular one-pole, a combination signal being present at a signal contact to ground, or is two-pole, having two signal contacts in order to be connected to a two-wire lead that preferably transmits the combination signal symmetrically, or is three-pole, the combination signal being present to ground and in addition two supply contacts being provided at the contact point, or is four-pole, a combination signal being transmitted differentially between two signal contacts, and a ground contact and a supply contact being present.

In order to combine the supply signal and the sensor signal (both in converted form), a multiplexer is provided. The multiplexer can be connected upstream from the A/D converter, and can multiplex, i.e. combine by multiplexing, the supply signal and the sensor signal in converted form. The resulting signal is forwarded to the A/D converter by the multiplexer. The A/D converter then forwards the signal converted in this way for transmission to the signal transmission unit. In addition, the multiplexer can be provided in the input stage of the A/D converter, so that a plurality of channels result. The multiplexer can also be connected downstream from the A/D converter, in order to combine the converted sensor signal and the converted supply signal by multiplexing. In the latter case, the A/D converter has a plurality of channels, a specific signal, i.e. the supply signal or the sensor signal, being assigned to each channel.

According to the present invention, a multiplexer can be connected upstream from the A/D converter, or can form a part of an input interface of the A/D converter. The multiplexer has at least two inputs. One of these inputs is connected to the sensor element, and another of these inputs is connected to the supply signal tap. The multiplexer is preferably a time multiplexer.

In addition, it can be provided that the signal transmission unit has a multiplexer. Here, an input of the multiplexer is connected to an output of the A/D converter. This output of the A/D converter is assigned to the converted supply signal that is converted by the A/D converter. A further input of the multiplexer is connected to an output of the A/D converter. The latter output of the A/D converter is assigned to the sensor signal.

In addition, the A/D converter can be a multichannel A/D converter having a plurality of converter elements. An input of one of these converter elements is connected to the sensor element, and an input of another of these converter elements is connected to the supply signal tap. In this configuration, a multiplexer is preferably connected downstream from the multichannel A/D converter. The multiplexer can in particular be a part of an input stage of the signal transmission unit. In the latter configuration, the sensor signal and the supply signal are individually converted in parallel fashion in the converter elements of the multichannel A/D converter, the converted supply signal being combined with the converted sensor signal by a multiplexer that is connected downstream from the A/D converter.

The unconverted supply signal represents the supply state of the sensor module, in particular the supply state of the sensor element, of the A/D converter, of the signal transmission unit, and/or of further components of the sensor module, for example a multiplexer. The supply signal represents the supply state for example on the basis of a supply voltage or a supply current present immediately at the sensor module or inside the sensor module. Thus, if for example a drop in voltage occurs in a supply line, the supply signal represents the actual supply state of the sensor module or the components thereof, and not the voltage applied to a remotely situated point on the supply line. There are a plurality of possibilities for acquiring the supply state via the supply signal, where the supply signal is present at a supply signal tap of the sensor module. The supply signal tap can be an individual contact or can be a simple tapping or branching of a line that conducts the supply signal, for example a tapping or branching of a printed conductor on which the supply signal is present.

Therefore, according to the present invention it is provided that the supply signal tap is provided on a supply voltage rail of the sensor module at which the supply voltage is present. The further components of the sensor module, in particular the sensor element, the A/D converter, and/or the signal transmission unit, are fed by this supply voltage. In an alternative to this, the supply signal tap can be provided on a voltage divider that is connected to the supply voltage rail. Here, the outer terminals of the voltage divider are connected to the supply voltage rail, or to ground of the electrical supply of the sensor module, and a center tap of the voltage divider provides the supply signal tap. In the examples named above, a level, or amplitude level, represents the supply state.

A further possibility is for the supply signal tap to be provided on a shunt resistor situated in a power supply of the sensor module. In particular, the shunt resistor is connected in series between a supply input of the sensor module and the supply inputs of the individual components of the sensor module. The supply current that flows through the shunt resistor produces a voltage proportional to the supply current. A tap on the shunt resistor thus provides the associated potential, which is immediately proportional to the supply current. The supply signal tap is connected to the shunt resistor at the point thereof at which the potential is present. Here as well, a level, or amplitude level, represents the supply state. Alternatively to a shunt resistor, another element can be used for the current acquisition, such as a Hall sensor.

Another possibility is for the supply signal tap to be provided on an internal control signal line that is situated in a voltage converter or in a voltage regulator. The voltage converter or the voltage regulator is situated in a power supply of the sensor module. In order to keep the voltage constant, or to provide a particular voltage level, voltage converters or voltage regulators are suitable that are provided on or in the sensor module, and in particular in the power supply thereof. The internal control signal line to which the supply signal tap is connected is for example an input line of an end stage of the voltage converter or of the voltage regulator. The level thereof represents the supply state. In addition, the internal control signal line can be a scrambler control line that transmits a control signal having a pulse-duty factor. In voltage converters, an input voltage is scrambled using the pulse-duty factor, the level of the pulse-duty factor determining the level of the output voltage that is outputted as a supply voltage. Such a control signal line therefore provides a signal having a pulse-duty factor that immediately represents the output voltage. If the input voltage of the voltage converter is too low, then the pulse-duty factor has values outside a standard range. The supply signal tap thus provides a supply signal whose pulse-duty factor represents the supply state of the sensor module. Instead of a pulse-duty factor, the frequency or a pulse duration can represent the supply state, a scrambler being provided in a voltage converter that is controlled in accordance with this frequency or pulse duration (or also in accordance with the above-named pulse-duty factor). Here, the signal of the control signal line, and in particular the pulse-duty factor, the frequency or the pulse duration of the signal, represents the supply state. In general, the supply signal represents the supply state and in particular represents whether the components of the sensor module are being provided with voltage, or current, in a normal operating range.

In the case of a supply signal tap that is provided at an internal control signal line that controls a scrambler in a voltage converter, the supply signal is a binary signal and need not necessarily be converted by the A/D converter. In this case, the A/D converter, whose input is connected to the supply signal tap, is for example a voltage follower or an impedance converter or an operational amplifier that modifies or adapts the signal level of the supply signal on the control signal line and/or converts the impedance. For example, in this case the A/D converter can be a logical gate, for example a NOT gate, in order to convert the analog supply signal tap into a converted supply signal whose level is defined by the gate.

In addition, the present invention can be realized by a method for monitoring a sensor module. Thus, the present invention further provides a method for monitoring a sensor module that acquires an operating parameter of a motor vehicle. Here, a sensor element of the sensor module outputs a sensor signal. The sensor signal outputted by the sensor element is converted by an A/D converter and is transmitted as a converted sensor signal by a signal transmission unit. According to the present invention, an unconverted supply signal, which represents a supply voltage or a supply current of the sensor module, is converted into a converted supply signal by the A/D converter, which also converts the sensor signal. Thus, the A/D converter converts both the sensor signal and the supply signal. Here, the sensor module, the sensor element, the A/D converter, and the signal transmission unit correspond to the components defined above in the context of the sensor module and having the same designation.

The A/D converter can simultaneously convert the sensor signal and the supply signal when the A/D converter is realized as a multichannel A/D converter. Alternatively, the A/D converter can convert the supply signal and the sensor signal one after the other, a time multiplexer combining the sensor signal and the supply signal before the conversion by the A/D converter, using time multiplexing. In addition, after the conversion by the A/D converter the sensor signal and the supply signal can be combined by a multiplexer using multiplexing, in particular time multiplexing.

According to a specific embodiment of the method of the present invention, the signal transmission unit that transmits the converted sensor signal also transmits the converted supply signal. Here, the signal transmission unit transmits a combination signal that includes a combination of the converted sensor signal and the converted supply signal. The combination is provided in particular by multiplexing, preferably time multiplexing.

As explained above on the basis of the sensor module according to the present invention, the combination of the converted sensor signal with the converted supply signal can take place in various ways. The converted sensor signal and the converted supply signal can be combined via multiplexing to form the combination signal. Here, the signal transmission unit transmits the combination signal. In addition, the sensor signal outputted by the sensor element and the unconverted supply signal can be combined by multiplexing to form a combination signal that, after conversion by the A/D converter, is transmitted by the signal transmission unit. In addition, the signal transmission unit can provide at least two logical channels for the transmission. Here, the converted sensor signal is assigned to one of the logical channels for the transmission, and the converted supply signal is assigned to another of the logical channels for the transmission. The two logical channels are combined to form a combination signal and are transmitted. Two logical channels can for example be achieved through different bit positions in a datagram or data packet, a first bit position segment being assigned to a first logical channel and a second bit position segment being assigned to a second logical channel. The two bit position segments can be combined to form a bit word that is transmitted. In addition, the different channels can be provided through data packets, a first group of data packets being assigned to the first channel and a second group of data packets being assigned to a second channel, the data packets of the different logical channels being transmitted in alternating fashion. In addition, one and the same data packet can include items of information that belong to both logical channels. In addition, data packets include a header in which for example a target address is indicated. In addition, data packets and/or the above-named bit word can additionally include an item of information about the priority of the logical channels. The logical channels can in particular be provided by time multiplexing or by other types of multiplexing. In addition, as already mentioned as an example, the logical channels can be provided by different bit segments, by different data packets, or by different bit segments in data packets.

As a further possibility, the A/D converter that converts the unconverted supply signal can be a multichannel A/D converter. The unconverted supply signal is converted by a channel of the multichannel A/D converter. The sensor signal is converted by a different channel of the multichannel A/D converter. The outputs of the channels of the multichannel A/D converter are combined by multiplexing to form a combination signal. The combination signal is transmitted by the signal transmission unit. In particular, the combination signal is transmitted to a central data processing device of the motor vehicle or to a remotely situated data processing device of the motor vehicle. For example, the combination signal is transmitted via a single-wire or two-wire lead. The transmission is preferably a serial transmission. The transmission can in particular be packet-switched, or can include a multiple-access method.

According to a further specific embodiment of the method according to the present invention, the signal transmission unit transmits the converted sensor signal with a higher priority, with a higher data transmission rate, with a higher resolution, or with a higher updating rate or repetition rate than the converted supply signal. Here, within the combination signal the information segment is assigned a higher priority, a higher data transmission rate, a higher resolution, or a higher updating rate than is the converted supply signal transmitted with the same combination signal.

The unconverted supply signal can be a voltage level that is proportional to or identical with the supply voltage of the sensor module. In particular, the unconverted supply signal can be a voltage level obtained from the supply voltage through voltage division. In addition, the unconverted supply signal can be a voltage that, in accordance with a shunt resistor within the power supply of the sensor module, is proportional to the supply current of the sensor module. The unconverted supply signal can thus be a voltage that is dropped in the shunt resistor through which a supply current of the sensor module flows.

A further possibility is for the unconverted supply signal to be an internal control signal within a voltage converter or voltage regulator. The sensor module or components thereof are supplied using the voltage regulator or the voltage converter. The output voltage of the voltage converter or of the voltage regulator is set in accordance with the internal control signal. The internal control signal corresponds to the internal control signal that was explained above on the basis of the voltage converter or voltage regulator. The supply signal can in particular be a control signal of an end stage, or can represent a pulse duration, a frequency, or a pulse-duty factor with which a scrambler of the voltage regulator is controlled.

Such an internal control signal can for example be tapped at a corresponding terminal of a voltage regulator or voltage converter, for example at a control terminal.

In addition, the present invention can be realized by a combination signal. Such a combination signal combines at least one sensor signal and a supply signal. The at least one sensor signal represents at least one operating parameter of a motor vehicle, the at least one operating parameter having been acquired by at least one sensor module of the motor vehicle. The supply voltage signal represents a supply voltage or a supply current that is present at the at least one sensor module. The combination signal represents the sensor signal and the supply signal in alternating fashion or on parallel logical channels.

Here, the combination signal can represent the sensor signal and the supply signal at respectively different time slots. The different time slots can be regarded as parallel logical channels. The time slots can be the sequence of a synchronous or asynchronous time multiplexing method, so that the combination is provided by time multiplexing and the time slots are provided by the time multiplexing method. In addition, the combination signal can combine the sensor signal and the supply signal in data packets that are to be sent repeatedly. A segment of each data packet represents the sensor signal and a further segment of the same data packet represents the supply signal. A further alternative is for the combination signal to include different types of data packets, a first type representing the sensor signal and a second type representing the supply signal. The sensor signal and the supply signal are in this way individually assigned to different packets. If the combination signal includes data packets, then these can have further information concerning the priority, a higher priority being assigned to a data segment or data packet that represents a sensor signal. In addition, the combination signal can represent the sensor signal with a higher data transmission rate or a higher resolution than the supply signal. In particular, the combination signal can have segments that represent the sensor signal, these segments occurring in the combination signal with a higher updating rate or repetition rate than segments that represent the supply signal or that are assigned thereto.

The combination signal is preferably a serial signal. In particular, the combination signal is a single signal having a single level whose temporal curve represents the content of the combination signal. In this way, the combination signal is suitable for transmission via a one-wire lead or via a (symmetrical) two-wire lead. In this way, the combination signal is suitable for transmission via existing wiring technologies in which only a single lead is already present for transmitting a sensor signal; according to the present invention, the combination signal and thus also the supply signal are transmitted via this line.

According to an aspect of the present invention, the combination signal represents the supply signal as a low-pass-filtered version of the supply signal. In this way, short drops in voltage that do not have any disadvantageous effects, for example due to buffering, can be filtered out and excepted from further processing. Equally, the sensor signal can be present as a low-pass-filtered form thereof in the combination signal.

Correspondingly, the sensor module according to the present invention can have a low-pass filter that is situated between the A/D converter and the supply signal tap. Such a low-pass filter is preferably an analog low-pass filter. In addition, the sensor module can have a low-pass filter that is situated between the A/D converter and the signal transmission unit. A low-pass filter of the latter type is preferably a digital low-pass filter. In addition, in an input stage of the signal transmission unit there can be provided a low-pass filter that is preferably digital. In addition, it is possible for a low-pass filter to be present between the sensor element and the A/D converter, or between the A/D converter and the signal transmission unit.

In a further corresponding specific embodiment, the method according to the present invention provides that the unconverted supply signal is low-pass-filtered before it is supplied to the A/D converter, or it can be provided that the converted supply signal that is outputted by the A/D converter is low-pass-filtered before the signal transmission unit transmits it. In the same way, the sensor signal can be low-pass-filtered before conversion by the A/D converter, or after conversion by the A/D converter.

DETAILED DESCRIPTION OF THE INVENTION

Figure 1:
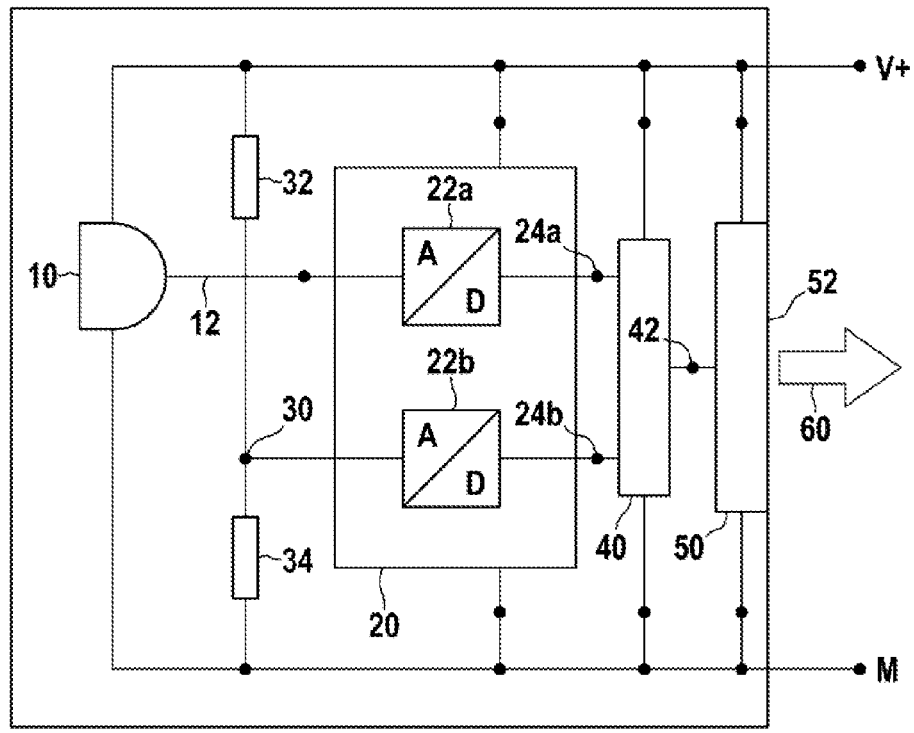
FIG. 1 shows a first specific embodiment of a sensor module according to the present invention.

FIG. 1 shows a first specific embodiment of a sensor module according to the present invention having a sensor element 10 that has an output 12 that is set up to output a sensor signal of sensor 10. Sensor 10 is in addition connected to supply voltage potentials V+ and M, and is supplied with electric power via these. The sensor module shown in FIG. 1 further includes an A/D converter 20 having two converter elements 22a, 22b. A/D converter 20 thus has a multichannel design, a first channel being provided by converter element 22a and a second channel being provided by converter element 22b. While the first channel, i.e. converter element 22a, is connected to output 12 of sensor element 10, converter element 22b is connected to a supply signal tap 30. Supply signal tap 30 corresponds to a center tap of an ohmic voltage divider formed by two serial resistances 32, 34. Resistances 32, 34 of the voltage divider are configured in series and are connected to supply voltage potentials V+ and M. The potential present at the center tap of the voltage divider represents the supply voltage, which is reduced in accordance with the ratio of resistances 32 and 34 to one another.

A/D converter 20 is connected to supply voltage potentials V+ and M, as is sensor 10. Converter elements 22a and 22b are thus supplied by supply voltage potentials V+ and M.

The sensor module of FIG. 1 further includes a multiplexer 40 that has a respective input for each of the converter elements 22a and 22b. Each channel, or each converter element 22a, 22b of A/D converter 20, provides an output 24a, 24b that is connected to an associated input of multiplexer 40. Multiplexer 40 combines the levels of outputs 24a, 24b of A/D converter 20 using multiplexing, and outputs the resulting combination signal at an output 42 of the multiplexer. Converter element 22b with which the unconverted supply signal is converted, or the channel assigned to the supply signal, can have a lower temporal or value-related resolution than the other converter element 22a, or the other channel. In particular specific embodiments, converter element 22b can be formed by a comparator or a logical gate, whereby only two different output levels of the converted supply signal are provided. The converter element of the supply signal has in this case a resolution of only two stages, the converter element of the supply signal preferably having a resolution of more than two stages, such as $2^N$ stages, where N=4, 6, 8, or more.

The sensor module further includes a signal transmission unit 50 whose input is connected to output 42 of multiplexer 40. The transmission unit provides a physical input/output interface 52 to which a line can be connected. Arrow 60 symbolically indicates the transmission path by which signal transmission unit 50 transmits signals via input/output interface 52, for example to centrally situated and/or remotely situated data processing devices. Input/output interface 52 preferably includes a plug contact and is in particular a serial interface. The transmission of signal transmission unit 50 indicated by arrow 60 leads to a central data processing unit realized in particular as an on-board computer of the motor vehicle in which the sensor module is situated. Supply voltage potentials M and V+ are connected to the electrical network of the motor vehicle, so that the sensor module can be supplied by the vehicle electrical network.

In the specific embodiment shown in FIG. 1, two separate channels are used for the processing of the sensor signal and of the supply signal, a multiplexer 40 connected downstream from A/D converter 20 combining the two converted signals by multiplexing, in particular time multiplexing. Instead of a combination by time multiplexing, the multiplexer can also in some other way provide two or more logical channels that are transmitted in parallel via a common physical channel of output interface 52 by signal transmission unit 50. The logical channels are provided by a multiple-access method, in particular by time multiplexing, frequency multiplexing, or code multiplexing.

Figure 2:
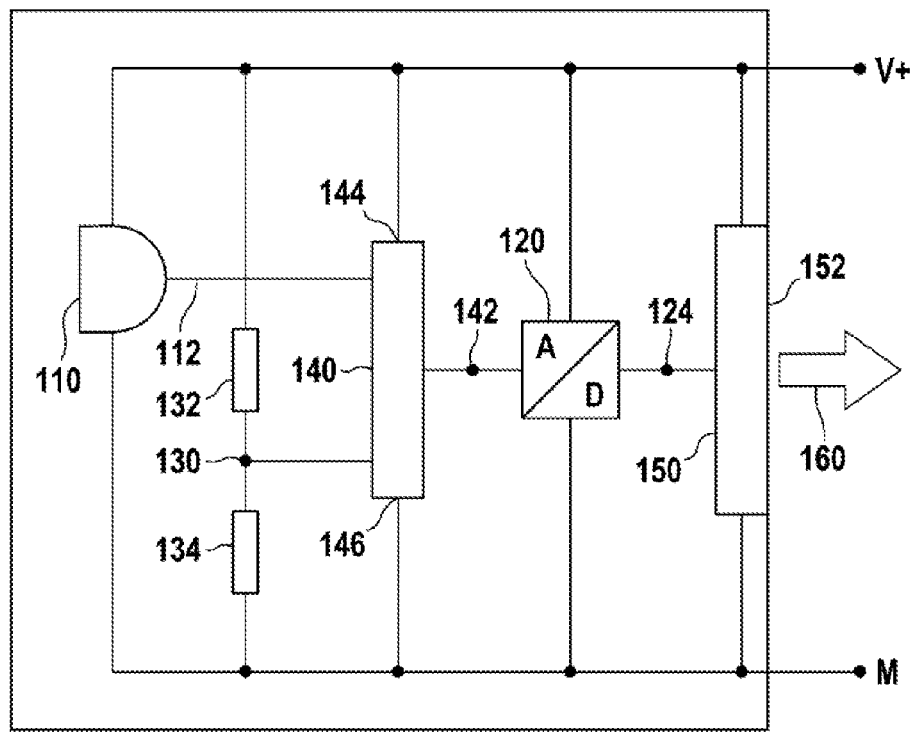
FIG. 2 shows a second specific embodiment of the sensor module according to the present invention.

The second specific embodiment according to the present invention of the sensor module, shown in FIG. 2, includes a sensor 110 having an output 112, the sensor module 110 being supplied by supply potentials V+ and M. Output 112 of sensor element 110 is connected to an input of a multiplexer 140. A further input of multiplexer 140 is connected to a supply signal tap 130. Supply signal tap 130 is provided, as in FIG. 1, by a center tap of a voltage divider. The voltage divider is formed by resistances 132 and 134 connected in series, the voltage divider having external terminals that are connected to supply voltage potentials M and V+. Multiplexer 140 is also supplied by supply voltage potentials V+ and M, through corresponding connections. Multiplexer 140 therefore has supply inputs 144, 146 that are connected to supply voltage potentials M and V+. Multiplexer 140 has an output 142 that is connected to an input of an A/D converter 120. Output 142 of multiplexer 140 is connected to an input of A/D converter 120. Output 142 of multiplexer 140 provides a combination signal that results through combination of the unconverted sensor signal and the unconverted supply signal by multiplexing. A/D converter 120 converts the combination signal, present in analog form, and outputs it at an output 124 of A/D converter 120. This converter is connected to an input of a signal transmission unit 150 that has an output interface 152. Signal transmission unit 150 is set up for the transmission of the combination signal, the corresponding transmission being represented by arrow 160. Both A/D converter 120 and signal transmission unit 150 are part of the supply module and are supplied with electric power by supply voltage potentials M and V+.

The specific embodiment shown in FIG. 2 provides that multiplexer 140 is connected upstream from A/D converter 120. In this way, A/D converter 120 already receives a combined signal made up of a combination of the unconverted (and thus analog) sensor and supply signals.

Figure 3:
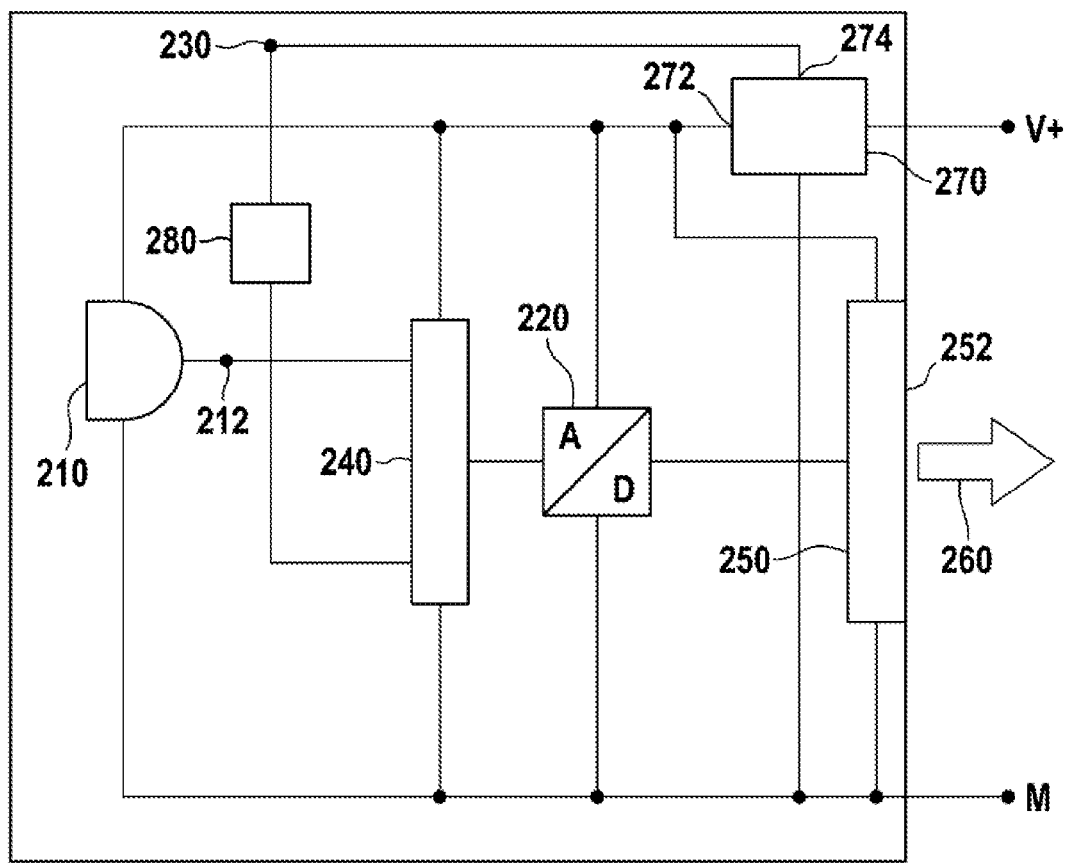
FIG. 3 shows a third specific embodiment of the sensor module according to the present invention.

FIG. 3 shows a third specific embodiment of the sensor module according to the present invention, having a sensor element 210, a multiplexer 240 connected downstream from sensor element 210, and having an A/D converter 220 connected downstream from multiplexer 240. The specific embodiment shown in FIG. 3 further includes a signal transmission unit 250 connected downstream from A/D converter 220. This configuration corresponds to the configuration shown in FIG. 2. The specific embodiment shown in FIG. 3 differs from the specific embodiment shown in FIG. 2 with regard to the supply of the components of the sensor module and with regard to the supply signal tap. Here, the specific embodiment shown in FIG. 3 provides that multiplexer 240 has a first input that is connected to an output 212 of sensor element 210, and has a second input that is connected to a supply signal tap 230. In contrast to the specific embodiment shown in FIG. 2, supply signal tap 230 is connected to a voltage regulator 270. This voltage regulator 270 includes a voltage input that is connected to supply voltage potential V+, and a control input that is connected to the ground of the supply voltage, corresponding to potential M. Voltage regulator 270 further includes a voltage output 272 that is connected to the components of the sensor module in order to supply them. In particular, supply output 272 of voltage converter 270 is connected to supply inputs of sensor element 210, multiplexer 240, A/D converter 220, and signal transmission unit 250. Voltage regulator 270 further includes a control signal output 274 that is connected (indirectly) to supply signal tap 230. Control output 274 is connected to an internal control signal line of voltage regulator 270 with which for example an end stage of voltage regulator 270 is controlled, or that conducts a signal of a regulation or controlling of the voltage regulator by which the output voltage at output 272 of voltage regulator 270 is set.

The sensor module according to the present invention, shown in FIG. 3, includes a low-pass filter 280 that is connected downstream from supply signal tap 230 and is connected upstream from multiplexer 240. In particular, low-pass filter 280 is connected (indirectly) upstream from A/D converter 220. In this way, fewer relevant voltage peaks are filtered out.

Voltage regulator 270 produces a supply signal that is present at supply signal tap 230 and is low-pass-filtered by downstream low-pass filter 280 before being supplied to multiplexer 240. Multiplexer 240 also receives a sensor signal from output 212 of sensor element 210. The sensor signal and the supply signal that multiplexer 240 receives are combined by multiplexer 240. The combined signal is supplied to A/D converter 220, which forwards the resulting combination signal in digitized form to signal transmission unit 250. Signal transmission unit 250 has an output interface 252 by which the combination signal is transmitted in digital form. Arrow 260 indicates the transmission path for the combination signal. In contrast to the specific embodiments of FIGS. 1 and 2, the unconverted supply signal of supply signal tap 230 is prepared by downstream low-pass filter 280 before the supply signal is combined with the sensor signal by multiplexer 240.

In a specific embodiment that represents an alternative to the specific embodiment of FIG. 3, no low-pass filter 280 is provided, so that supply signal tap 230 is connected immediately to an input of multiplexer 240.

In a further specific embodiment that represents an alternative to the specific embodiment shown in FIG. 1, multiplexer 40 is a part of the input stage of signal transmission unit 50. In this way, an interface can be saved between the multiplexer and the signal transmission unit.

The signal transmission unit preferably provides a serial output interface that preferably transmits bit words that represent the combination signal. The output interface of the signal transmission unit can in addition be set up to transmit control signals that establish and maintain a communication connection. In particular, the signal transmission unit can be set up to transmit the combination signal by packet switching. Here, data are transmitted in the form of packets that represent the combination signal and in which header information is present, such as a target address and/or a transmission priority. The sensor signal and the supply signal can here be distributed among different packets, or can each be combined in the packets. In particular, the signal transmission unit is set up to transmit the combination signal, i.e. the sensor signal and the supply signal, in accordance with one of the following standards: LIN (ISO 15765-2), CAN (ISO 11898), SENT (SAE J2716), or PSI5. In addition, the signal transmission unit, and in particular its output interface, can be fashioned in accordance with a different transmission protocol standard.

What is claimed is:

1. A sensor module configured to acquire an operating parameter of a motor vehicle, comprising:
    a sensor element outputting a sensor signal, the sensor element being connected directly to a supply voltage rail;
    an A/D converter connected to the sensor element and configured to convert the sensor signal from the sensor element, the A/D converter being connected directly to the supply voltage rail;
    a signal transmission unit connected to the A/D converter and configured to transmit the sensor signal converted by the A/D converter, the signal transmission unit being connected directly to the supply voltage rail; and
    a supply signal tap which receives an unconverted supply signal directly from the supply voltage rail, the unconverted supply signal representing one of a supply voltage or a supply current of the sensor module, wherein an input of the A/D converter is connected to the supply signal tap.

2. The sensor module as recited in claim 1, wherein the signal transmission unit is configured to transmit a supply signal converted by the A/D converter, the converted supply signal representing one of the supply voltage or the supply current of the sensor module.

3. The sensor module as recited in claim 2, wherein one of:
(i) a multiplexer is one of connected upstream from the A/D converter or forms a part of an input interface of the A/D converter, the multiplexer having one input connected to the sensor element and another input connected to the supply signal tap; or
(ii) the multiplexer is one of connected immediately upstream from the signal transmission unit or forms a part of the signal transmission unit, wherein one input of the multiplexer connected to an output of the A/D converter assigned to the supply signal converted by the A/D converter, and a further input of the multiplexer is connected to an output of the A/D converter assigned to the sensor signal; or
(iii) the A/D converter is a multichannel A/D converter having multiple converter elements, wherein an input of one of the converter elements is connected to the sensor element and an input of another of the converter elements is connected to the supply signal tap.

4. The sensor module as recited in claim 3, wherein the supply signal tap is provided on one of:
a supply voltage rail of the sensor module at which the supply voltage is present; or
a voltage divider connected to the supply voltage rail; or
a shunt resistor situated in a power supply of the sensor module; or
an internal control signal line situated in one of a voltage converter or a voltage regulator situated in a power supply of the sensor module.

5. A method for operating a sensor module which detects an operating parameter of a motor vehicle, comprising:
outputting a sensor signal by a sensor element of the sensor module, the sensor element being connected directly to a supply voltage rail;
converting the sensor signal of the sensor element by an A/D converter, the A/D converter being connected directly to the supply voltage rail;
transmitting the converted sensor signal by a signal transmission unit, the signal transmission unit being connected directly to the supply voltage rail; and
converting, by the A/D converter which converts the sensor signal, an unconverted supply signal from the supply voltage rail which represents one of a supply voltage or a supply current of the sensor module into a converted supply signal.

6. The method as recited in claim 5, wherein the signal transmission unit transmits the converted supply signal.

7. The method as recited in claim 6, wherein one of:
(i) the converted sensor signal and the converted supply signal are combined by multiplexing to form a combination signal, and the signal transmission unit transmits the combination signal; or
(ii) the sensor signal outputted by the sensor element and the unconverted supply signal are combined by multiplexing to form a combination signal, and the combination signal is converted by the A/D converter and subsequently transmitted by the signal transmission unit; or
(iii) the signal transmission unit provides a first logical channel for the transmission of the converted sensor signal and a second logical channel for the transmission of the converted supply signal; or
(iv) the A/D converter is a multichannel A/D converter, the unconverted supply signal being converted by a first channel of the multichannel A/D converter, the sensor signal being converted by a second channel of the multichannel A/D converter, and the outputs of the first and second channels of the multichannel A/D converter being combined by multiplexing to form a combination signal which is transmitted by the signal transmission unit.

8. The method as recited in claim 6, the signal transmission unit transmits the converted sensor signal with one of a higher priority, a higher data transmission rate, a higher resolution, or a higher updating rate than the converted supply signal.

9. The method as recited in claim 5, wherein the unconverted supply signal is one of:
(i) a voltage level which is one of proportional to or identical to the supply voltage of the sensor module;
(ii) a voltage which, in accordance with a shunt resistance inside the power supply of the sensor module, is proportional to the supply current of the sensor module; or
(iii) an internal control signal inside one of a voltage converter or a voltage regulator associated with the sensor module, the output voltage of the one of the voltage converter or the voltage regulator being set according to the internal control signal.

* * * * *